(12) United States Patent
Suzuki et al.

(10) Patent No.: US 6,619,150 B2
(45) Date of Patent: Sep. 16, 2003

(54) MANUAL TRANSMISSION

(75) Inventors: Hiroyuki Suzuki, Aichi (JP); Kan Sasaki, Aichi (JP)

(73) Assignee: Aisin Ai Co., Ltd., Nishio (JP)

( * ) Notice: Subject to any disclaimer, the term of this patent is extended or adjusted under 35 U.S.C. 154(b) by 0 days.

(21) Appl. No.: 09/859,378

(22) Filed: May 18, 2001

(65) Prior Publication Data

US 2001/0042416 A1 Nov. 22, 2001

(30) Foreign Application Priority Data

May 19, 2000 (JP) ........................................ 2000-148357
May 16, 2001 (JP) ........................................ 2001-145758

(51) Int. Cl.[7] .............................................. F16H 3/093
(52) U.S. Cl. ......................................... 74/331; 74/359
(58) Field of Search ........................... 74/331, 333, 359, 74/360

(56) References Cited

U.S. PATENT DOCUMENTS

| 4,738,149 A | * | 4/1988 | Janiszewski | ................. 74/331 |
| 4,738,150 A | * | 4/1988 | Miner | ......................... 74/359 |
| 4,799,395 A | * | 1/1989 | Janiszewski | ................. 74/331 |
| 4,799,399 A | * | 1/1989 | Bruce | .......................... 74/331 |
| RE33,336 E | * | 9/1990 | Bainbridge et al. | ........... 74/331 |
| 5,125,282 A | * | 6/1992 | Bender et al. | ................ 74/333 |
| 5,353,661 A | * | 10/1994 | Ordo | ........................... 74/331 |

FOREIGN PATENT DOCUMENTS

WO 97/13990 4/1997

* cited by examiner

*Primary Examiner*—Sherry Estremsky
(74) *Attorney, Agent, or Firm*—Burns, Doane, Swecker & Mathis, LLP

(57) ABSTRACT

A compact manual transmission, especially for use in FF drive vehicles, has a small overall length even though a synchronizer is provided exclusively for reverse gear. The transmission has an input shaft, first and second intermediate shafts disposed in parallel with the input shaft, and reverse gearing. The reverse gearing includes a low-speed driving gear disposed on the input shaft; a low-speed driven gear disposed on the first intermediate shaft for meshing with the low-speed driving gear; a reverse-only driving gear disposed on the first intermediate shaft; a synchronizer for reverse gear disposed on the reverse-only driving gear for causing the low-speed driven gear and the reverse-only driving gear to engage and disengage; and an intermediate-speed driven gear disposed on the second intermediate shaft for meshing with the reverse-only driving gear.

20 Claims, 3 Drawing Sheets

MANUAL TRANSMISSION

FIELD OF THE INVENTION

This invention relates to a manual transmission and, more particularly, to a manual transmission for a front-engine front-wheel (FF) drive vehicle having a transversely mounted engine.

BACKGROUND

In an FF drive vehicle having a transversely mounted engine, a more compact transmission is sought to deal with vehicles that are more compact, engines that have greater numbers of cylinders and transmissions have multiple speeds. The overall length of the transmission is a particularly important factor since it has a major influence upon the handling of the vehicle, e.g., the turning radius thereof. Demand for improved operability also has been increasing in recent years and addition of a synchronizer for reverse gear is sought. Accordingly, a manual transmission according to an example of the prior art disclosed in the specification of WO 97/13990 has a synchronizer Rs for reverse gear disposed on a second intermediate shaft 112, as illustrated in FIG. 3. The structure of the manual transmission according to this example of the prior art will now be described in detail.

As shown in FIG. 3, first and second intermediate shafts 111 and 112, respectively, are disposed in parallel with an input shaft 110 and an output shaft 113. Gear trains I, II, III and IV for first, second, third and fourth speeds, respectively, are provided extending between the first input shaft 110 and the first intermediate shaft 111, and gear trains V and VI for fifth and sixth speed, respectively, provided extending between the input shaft 110 and the second intermediate shaft 112. A reverse gear R is constituted by a first-speed driving gear 100a on the input shaft 110, a first-speed driven gear 100b on the first intermediate shaft 111, a reverse-only driving gear Ra integrated with the first-speed driven gear 100b, a reverse-only driven gear Rb and the reverse-gear synchronizer Rs on the second intermediate shaft 112. Furthermore, a first—second-speed synchronizer 111S$_1$ and a third—fourth-speed synchronizer 111S$_2$ are disposed on the first intermediate shaft 111, and the reverse-gear synchronizer Rs and a five—sixth-speed synchronizer 112s are disposed on the second intermediate shaft. No synchronizer, however, is disposed on the input shaft 110.

SUMMARY OF THE DISCLOSURE

In a case where a synchronizer is added onto reverse gear in order to improve operability, a problem which arises is an increase in the overall length of the manual transmission. If the reverse-only driving and driven gears Ra, Rb, namely a total of two gears, are disposed on the first and second intermediate shafts 111, 112, as in the manual transmission proposed by the specification of WO 97/13990, as illustrated in FIG. 3, the axial lengths of the first and second intermediate shafts 111, 112 are increased by amounts equivalent to the gears Ra and Rb. The problem that results is an increase in the overall length L of the manual transmission.

Accordingly, an object of the present invention is to provide a manual transmission having a small overall length even though a synchronizer is provided exclusively for reverse gear.

Another object of the present invention is to provide a compact manual transmission having a small overall length especially for use in FF drive vehicles.

According to an aspect of the present invention, at least one of the foregoing object is attained by providing a manual transmission comprising an input shaft; first and second intermediate shafts disposed in parallel with the input shaft; and a reverse-gear stage; wherein the reverse-gear stage includes: a low-speed driving gear disposed on the input shaft; a low-speed driven gear disposed on the first intermediate gear for meshing with the low-speed driving gear; a reverse-only driving gear disposed on the first intermediate shaft; a synchronizer for reverse gear disposed on the first intermediate shaft or reverse-only driving gear for causing the low-speed driven gear and the reverse-only driving gear to engage and disengage; and an intermediate-speed driven gear disposed on the second intermediate shaft for meshing with the reverse-only driving gear.

In the manual transmission according to the present invention, a prescribed gear among the low- and intermediate-speed gears functions also as a gear for reverse, as a result of which the number of reverse-only gears which function solely in reverse gear is reduced. By thus reducing the number of reverse-only gears, the lengths of the input shaft and of the first and second intermediate shafts in this manual transmission are reduced, as a result of which the overall length of the manual transmission is diminished. This also makes it possible to reduce the number of component parts of the manual transmission as well as the manufacturing cost of thereof.

According to another aspect of the present invention, there is provided a manual transmission comprising: an input shaft; first and second intermediate shafts disposed in parallel with the input shaft; a first-speed driving gear, a second-speed driving gear, a third-speed driving gear, a fourth-speed driving gear, a fifth driving gear and a six-speed driving gear disposed on the input shaft; a reverse-only driving gear, a first-speed driven gear and a second-speed driven gear disposed on the first intermediate shaft; a third-speed driven gear, a fourth-speed driven gear, a fifth-speed driven gear and a sixth-speed driven gear disposed on the second intermediate shaft; a third—fourth-speed synchronizer disposed on the first input shaft for selectively engaging and disengaging the third-speed driving gear or the fourth-speed driving gear with said input shaft; a synchronizer for reverse gear disposed on the first intermediate shaft or reverse-only driving gear for causing the first-speed driven gear and the reverse-only driving gear to engage and disengage; a first—second-speed synchronizer disposed on the first intermediate shaft for selectively engaging and disengaging the first-speed driven gear or the second-speed driven gear with the first shaft; and a fifth—sixth-speed synchronizer disposed on the second intermediate shaft for selectively engaging and disengaging the fifth-speed driven gear or the sixth-speed driven gear with the second intermediate gear; wherein a reverse-gear stage is constructed by the first-speed driving gear, the first-speed driven gear, the reverse-only driving gear, the third-speed driven gear and the synchronizer for reverse gear.

PREFERRED EMBODIMENTS OF THE INVENTION

In a preferred embodiment of the present invention, the reverse-gear stage of the manual transmission includes a first-speed driving gear, a first-speed driven gear and a third-speed driven gear.

In a preferred embodiment of the manual transmission, an intermediate-speed synchronizer, a low-speed synchronizer and a high-speed synchronizer are disposed on the input shaft, the first intermediate shaft and the second intermediate shaft, respectively. By thus disposing a plurality of synchronizers on respective shafts in dispersed fashion, the axial length of each shaft can be reduced overall.

In a preferred embodiment of the manual transmission, the low-speed driven gear constituting reverse gear has one gear piece capable of engaging the synchronizer for reverse gear, and another gear train constituting intermediate or high speed is situated between the gear body of the low-speed driven gear and the one gear piece along the axial direction thereof.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
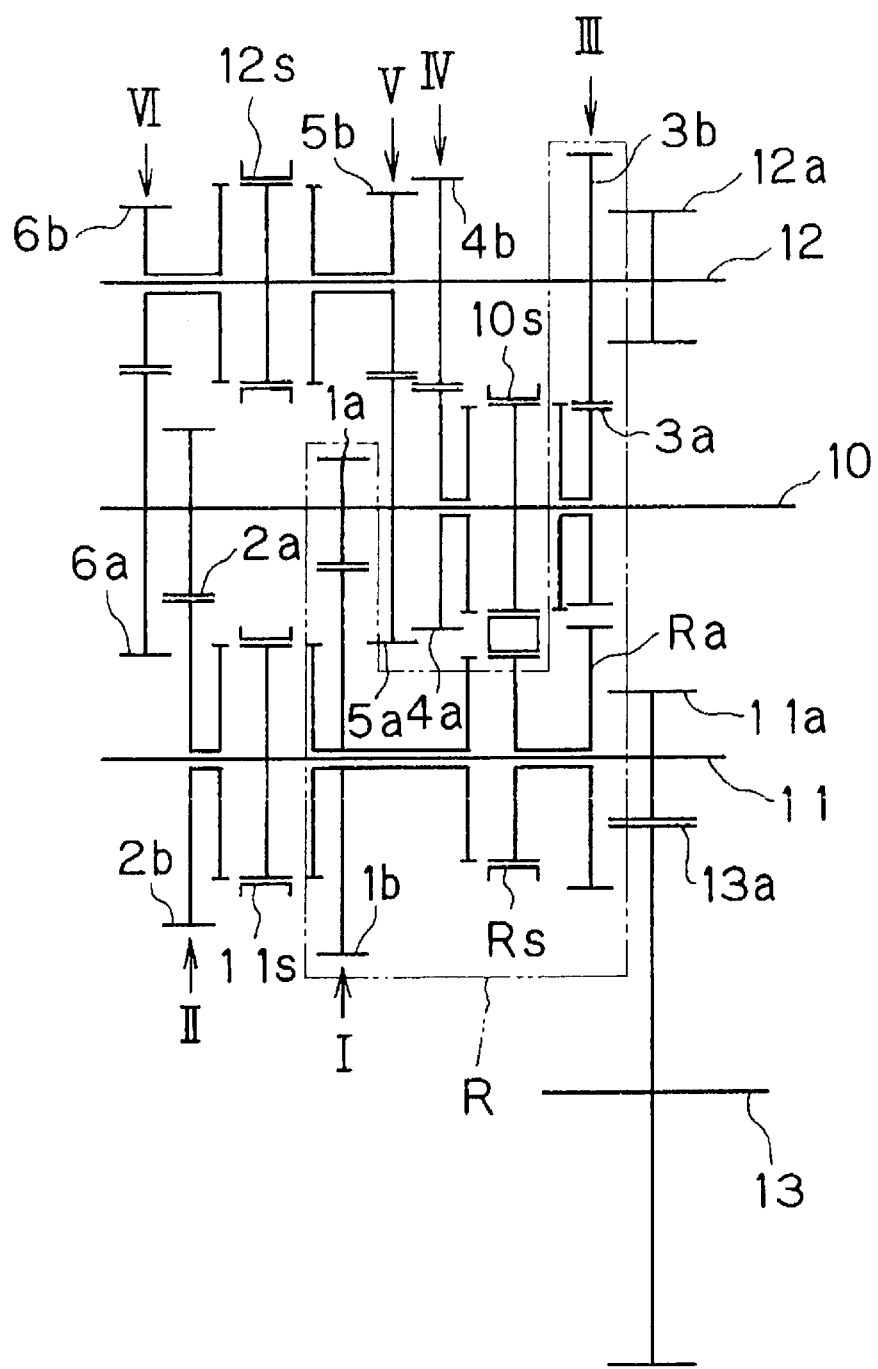
FIG. 1 is a gear train diagram illustrating an embodiment of a manual transmission according to the present invention.
Figure 2:
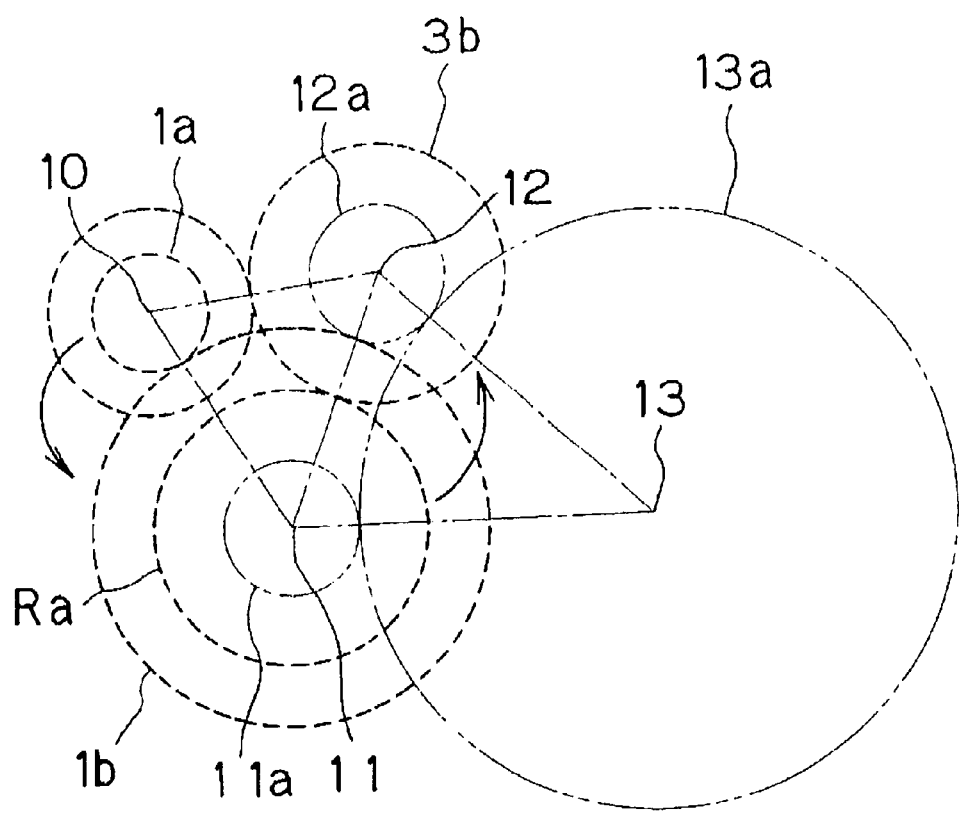
FIG. 2 is a diagram useful in describing the disposition of shafts in the manual transmission of FIG. 1.

A preferred embodiment of the present invention will now be described in detail with reference to the accompanying drawings, in which FIG. 1 is a gear train diagram illustrating an embodiment of a manual transmission according to the present invention and FIG. 2 is a diagram useful in describing the disposition of shafts in the manual transmission of FIG. 1.

As shown in FIGS. 1 and 2, the manual transmission includes an input shaft 10 and an output shaft 13 disposed in parallel with each other, and first and second intermediate shafts 11 and 12, respectively, disposed in parallel with the input shaft 10 and output shaft 13.

A third-speed driving gear 3a, a fourth-speed driving gear 4a, a fifth-speed driving gear 5a, a first-speed driving gear 1a, a second-speed driving gear 2a and a sixth-speed driving gear 6a are disposed on the input shaft 10 in the order mentioned starting from the right side of FIG. 1. The third- and fourth-speed driving gears 3a, 4a are capable rotating relative to the input shaft 10. The first-, second-, fifth- and sixth-speed driving gears 1a, 2a, 5a and 6a, respectively, co-rotate with the input shaft 10.

A first final driving gear 11a, a reverse-only driving gear Ra, a first-speed driven gear 1b and a second-speed driven gear 2b are disposed on the first intermediate shaft 11 in the order mentioned starting from the right side of FIG. 1. The reverse-only driving gear Ra and the first- and second-driven gears 1b, 2b are capable of rotating relative to the first intermediate shaft 11.

A second final driving gear 12a, a third-speed driven gear 3b, a fourth-speed driven gear 4b, a fifth-speed driven gear 5b and a sixth-speed driven gear 6b are disposed on the second intermediate shaft 12 in the order mentioned starting from the right side of FIG. 1. The fifth- and sixth-driven gears 5b, 6b are capable of rotating relative to the second intermediate shaft 12.

A third—fourth-speed synchronizer 10s is disposed on the input shaft 10 between the third-speed driving gear 3a and fourth-speed driving gear 4a. The third—fourth-speed synchronizer 10s selectively engages and disengages the third-speed driving gear 3a and fourth-speed driving gear 4a with the input shaft 10.

A reverse-gear synchronizer Rs is disposed on the first intermediate shaft 11 or reverse-only driving gear Ra between the main body of the reverse-only driving gear Ra (namely the portion that meshes with the third-speed driven gear 3b) and the first-speed driven gear 1b. The reverse-gear synchronizer Rs causes the first-speed driven gear 1b and third-speed driven gear 3b to engage and disengage.

A fifth—sixth speed synchronizer 12s is disposed on the second intermediate shaft 12 between the fifth-speed driven gear 5b and sixth-speed driven gear 6b. The fifth—sixth speed synchronizer 12s selectively engages and disengages the fifth-speed driven gear 5b and sixth-speed driven gear 6b with the second intermediate shaft 12.

The first-speed driving gear 1a and first-speed driven gear 1b are in mesh with each other and construct a first-speed gear train I. The second-speed driving gear 2a and second-speed driven gear 2b are in mesh with each other and construct a second-speed gear train II. The third-speed driving gear 3a and third-speed driven gear 3b are in mesh with each other and construct a third-speed gear train III. The fourth-speed driving gear 4a and fourth-speed driven gear 4b are in mesh with each other and construct a third-speed gear train IV. The fifth-speed driving gear 5a and fifth-speed driven gear 5b are in mesh with each other and construct a fifth-speed gear train V. The sixth-speed driving gear 6a and sixth-speed driven gear 6b are in mesh with each other and construct a sixth-speed gear train VI.

The first-speed driven gear 1b has a first gear piece that is capable of engaging with the reverse-gear synchronizer Rs, and a second gear piece that is capable of engaging with a first—second speed synchronizer 11s. The fourth- and fifth-speed gear trains IV, V are situated between the gear body of the first-speed driven gear 1b that meshes with the first-speed driving gear 1a and the first gear piece in the axial direction.

[Reverse Gear]

The reverse gearing will now be described in detail.

With reference again to FIGS. 1 and 2, reverse gearing R includes the first-speed driving gear 1a, the first-speed driven gear 1b, the reverse-only driving gear Ra, the third-speed driven gear 3b and the reverse-gear synchronizer Rs. The reverse-gear synchronizer Rs has a sleeve which, by being operatively shifted toward the first-speed driven gear 1b when the transmission is placed in reverse, engages with the first-speed driven gear 1b so that the reverse-only driving gear Ra and first-speed driven gear 1b co-rotate.

The transmission of power when the transmission is placed in reverse is as follows: Torque input to the input shaft 10 is transmitted to the output shaft 13 via the first-speed driving and driven gears 1a, 1b, respectively, the sleeve of the reverse-gear synchronizer Rs, the reverse-only driving gear Ra, the third-speed driven gear 3b, the second intermediate shaft 12, the second final driving gear 12a, and a final driven gear 13a.

The advantages of the manual transmission set forth above will now be described.

Figure 3:
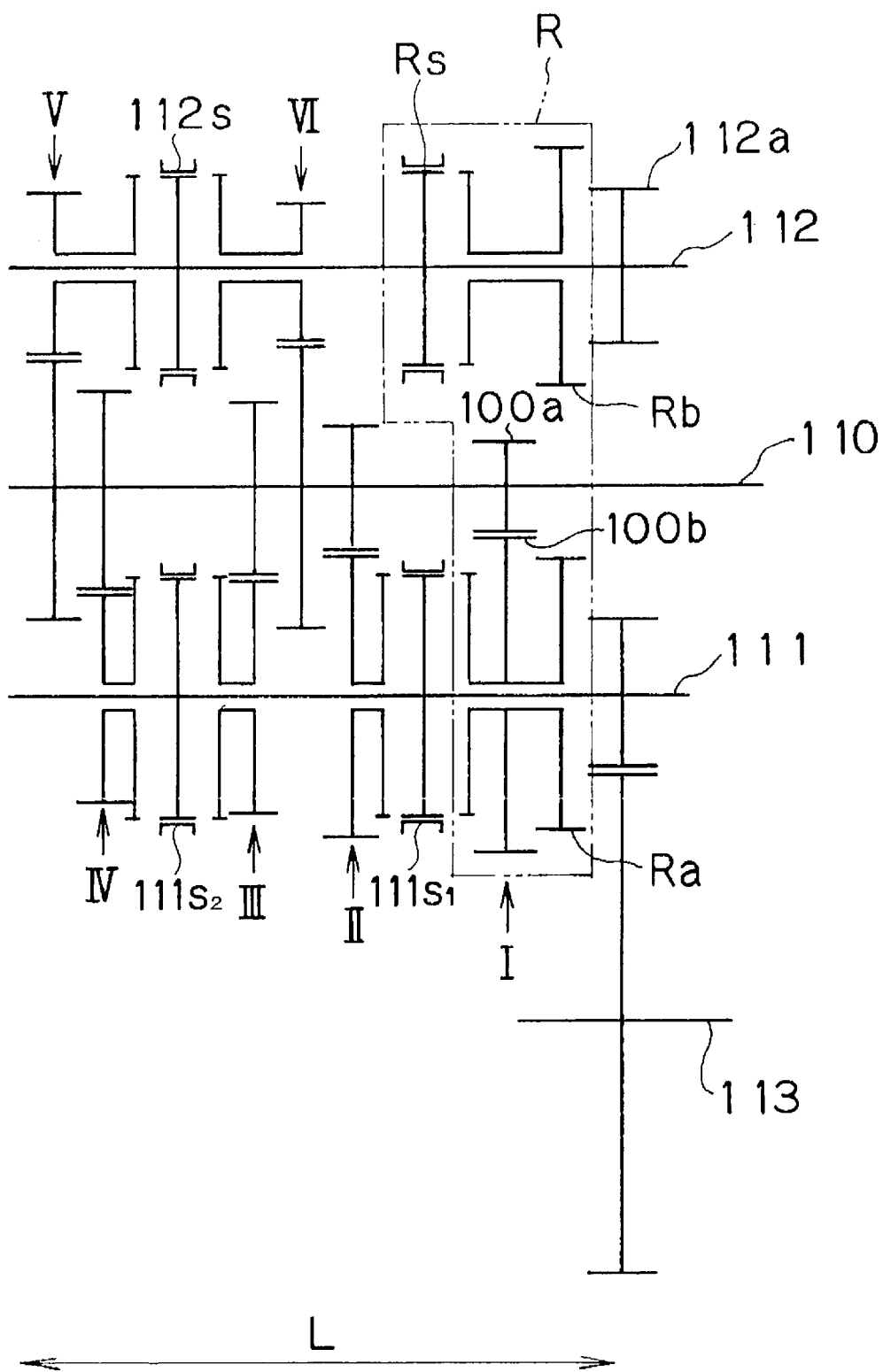
FIG. 3 is a gear train diagram illustrating a manual transmission according to an example of the prior art.

With reference again to FIGS. 1 and 2, the number of reverse-only gears which function only in reverse gear is only one (the reverse-only driving gear Ra) owing to utilization of the first-speed driving gear 1a, first-speed driven gear 1b and third-speed driven gear 3b in the reverse gearing of this manual transmission. This is fewer than the number of reverse-only gears in the manual transmission according to the prior art shown in FIG. 3. By thus reducing the number of reverse-only gears, the input shaft 10, first intermediate shaft 11 and second intermediate shaft 12 in the manual transmission according to this embodiment of the present invention are reduced in axial length, as a result of which the overall length 1 (see FIG. 1) of the manual transmission can be made shorter than the overall length L (see FIG. 3) of the conventional manual transmission. This in turn makes it possible to reduce the number of component parts of the manual transmission as well as the manufacturing cost thereof.

Although an example in which the present invention is worked as a manual transmission having six forward speeds and one reverse speed, this does not impose a limitation upon the present invention. For example, the present invention can be worked as a manual transmission having numbers of speeds different from those stated.

Thus, the present invention provides a compact manual transmission having a small overall length regardless of the fact that the transmission has a synchronizer exclusively for reverse gear.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A manual transmission comprising:
    an input shaft of a single structure constituting the only input shaft for the transmission;
    first and second intermediate shafts disposed in parallel with said single structure input shaft; and
    a reverse-gear stage;
    said reverse-gear stage including:
        a low-speed driving gear disposed on said single structure input shaft;
        a low-speed driven gear disposed on said first intermediate shaft for meshing with said low-speed driving gear;
        a reverse-only driving gear disposed on said first intermediate shaft;
        a synchronizer for reverse gear stage disposed on said first intermediate shaft or reverse-only driving gear for causing said low-speed driven gear and said reverse-only driving gear to engage and disengage; and
        an intermediate-speed driven gear disposed on said second intermediate shaft for meshing with the reverse-only driving gear.

2. The transmission according to claim 1, wherein said low-speed driven gear of said reverse-gear stage includes:
    a gear body for meshing with said low-speed driving gear of said reverse-gear stage; and
    a first gear piece capable of engaging with said synchronizer for reverse gear stage;
    another gear train for constructing intermediate speed or high speed being situated between said gear body and said first gear piece in the axial direction thereof.

3. A manual transmission comprising:
    an input shaft;
    first and second intermediate shafts disposed in parallel with said input shaft;
    a reverse-gear stage;
    said reverse-gear stage including:
        a low-speed driven gear disposed on said input shaft;
        a low-speed driven gear disposed on said first intermediate shaft for meshing with said low-speed driving gear;
        a reverse-only driving gear disposed on said first intermediate shaft;
        a synchronizer for reverse gear stage disposed on said first intermediate shaft or reverse-only driving gear for causing said low-speed driven gear and said reverse-only driving gear to engage and disengage; and
        an intermediate-speed driven gear disposed on said second intermediate shaft for meshing with the reverse-only driving gear;
    an intermediate-speed synchronizer, a low-speed synchronizer and a high-speed synchronizer disposed on said input shaft, said first intermediate shaft and said second intermediate shaft, respectively, in dispersed fashion.

4. The transmission according to claim 3, wherein said low-speed driven gear of said reverse-gear stage includes:
    a gear body for meshing with said low-speed driving gear of said reverse-gear stage; and
    a first gear piece capable of engaging with said synchronizer for reverse gear;
    another gear train for constructing intermediate speed or high speed being situated between said gear body and said first gear piece in the axial direction thereof.

5. A manual transmission comprising:
    an input shaft;
    first and second intermediate shafts disposed in parallel with said input shaft;
    first-speed driving gear, a second-speed driving gear, a third-speed driving gear, a fourth-speed driving gear, a fifth driving gear and a six-speed driving gear disposed on said input shaft;
    a reverse-only driving gear, a first-speed driven gear and a second-speed driven gear disposed on said first intermediate shaft;
    a third-speed driven gear, a fourth-speed driven gear, a fifth-speed driven gear and a sixth-speed driven gear disposed on said second intermediate shaft;
    a third—fourth-speed synchronizer disposed on said input shaft for selectively engaging and disengaging said third-speed driving gear or said fourth-speed driving gear with said input shaft;
    a synchronizer for reverse gear disposed on said first intermediate shaft or reverse-only driving gear for causing said first-speed driven gear and said reverse-only driving gear to engage and disengage;
    a first—second-speed synchronizer disposed on said first intermediate shaft for selectively engaging and disengaging said first-speed driven gear or said second-speed driven gear with said first shaft; and
    a fifth—sixth-speed synchronizer disposed on said second intermediate shaft for selectively engaging and disengaging said fifth-speed driven gear or said sixth-speed driven gear with said second intermediate shaft;
    wherein a reverse-gear stage is constructed by said first-speed driving gear, said first-speed driven gear, said reverse-only driving gear, said third-speed driven gear and said synchronizer for reverse gear.

6. A manual transmission comprising:

an input shaft of a single structure;

first and second intermediate shafts disposed in parallel with said single structure input shaft; and a reverse-gear stage;

said reverse-gear stage including:
- a low-speed driving gear disposed on said single structure input shaft;
- a low-speed driven gear disposed on said first intermediate shaft for meshing with said low-speed driving gear;
- a reverse-only driving gear disposed on said first intermediate shaft;
- a synchronizer for reverse gear stage disposed on said first intermediate shaft or reverse-only driving gear for causing said low-speed driven gear and said reverse-only driving gear to engage and disengage; and
- an intermediate-speed driven gear disposed on said second intermediate shaft for meshing with the reverse-only driving gear;

said low-speed driven gear of said reverse-gear stage including:
- a gear body for meshing with said low-speed driving gear of said reverse-gear stage;
- a first gear piece capable of engaging with said synchronizer for reverse gear stage; and
- another gear train for constructing intermediate speed or high speed being situated between said gear body and said first gear piece in the axial direction thereof;

an output shaft, and wherein power is transmitted from the input shaft to the output shaft in the reverse gear stage by engagement of said low-speed driven gear and said reverse-only driving gear to lock said low-speed driven gear and said reverse-only driving gear, the engagement of said low-speed driven gear and said reverse-only driving gear being the only lock required to effect the reverse gear stage.

7. A manual transmission comprising:

an input shaft of a single structure;

first and second intermediate shafts disposed in parallel with said single structure input shaft; and a reverse-gear stage;

said reverse-gear stage including:
- a low-speed driving gear disposed on said single structure input shaft;
- a low-speed driven gear disposed on said first intermediate shaft for meshing with said low-speed driving gear;
- a reverse-only driving gear disposed on said first intermediate shaft;
- a synchronizer for reverse gear stage disposed on said first intermediate shaft or reverse-only driving gear for causing said low-speed driven gear and said reverse-only driving gear to engage and disengage; and
- an intermediate-speed driven gear disposed on said second intermediate shaft for meshing with the reverse-only driving gear;
- wherein said low-speed driving gear is a first-speed driving gear that is fixed to said single structure input shaft, and including a second-speed driving gear, a third-speed driving gear, a fourth-speed driving gear, a fifth-speed driving gear and a sixth-speed driving gear, said second-speed driving gear, said fifth-speed driving gear and said sixth-speed driving gear being fixed to said single structure input shaft, said third-speed driving gear and said fourth-speed driving gear being rotatable relative to said single structure input shaft.

8. A manual transmission comprising:

an input shaft of a single structure;

first and second intermediate shafts disposed in parallel with said single structure input shaft; and a reverse-gear stage;

said reverse-gear stage including:
- a low-speed driving gear disposed on said single structure input shaft;
- a low-speed driven gear disposed on said first intermediate shaft for meshing with said low-speed driving gear;
- a reverse-only driving gear disposed on said first intermediate shaft;
- a synchronizer for reverse gear stage disposed on said first intermediate shaft or reverse-only driving gear for causing said low-speed driven gear and said reverse-only driving gear to engage and disengage; and
- an intermediate-speed driven gear disposed on said second intermediate shaft for meshing with the reverse-only driving gear;
- wherein said intermediate-speed driven gear is a third-speed driven gear.

9. A manual transmission comprising:

an input shaft;

first and second intermediate shafts disposed parallel to said input shaft;

a first-speed driving gear fixed to said input shaft;

a second-speed driving gear fixed to said input shaft;

a first-speed driven gear disposed on said first intermediate shaft for meshing with said first-speed driving gear;

a reverse-only driving gear disposed on said first intermediate shaft;

a synchronizer for reverse gear stage disposed on said first intermediate shaft or reverse-only driving gear for causing said first-speed driven gear and said reverse-only driving gear to engage and disengage; and an intermediate-speed driven gear disposed on said second intermediate shaft for meshing with the reverse-only driving gear.

10. The transmission according to claim 9, wherein said intermediate-speed driven gear is a third-speed driven gear.

11. The transmission according to claim 9, including a third-speed driving gear, a fourth-speed driving gear and a fifth-speed driving gear, said fifth-speed driving gear being fixed to said input shaft, and said third-speed driving gear and said fourth-speed driving gear being rotatable relative to said input shaft.

12. The transmission according to claim 9, including a third-speed driving gear, a fourth-speed driving gear, a fifth-speed driving gear and a sixth-speed driving gear, and said fifth-speed driving gear and said sixth-speed driving gear being fixed to said input shaft.

13. The transmission according to claim 12, wherein said third-speed driving gear and said fourth-speed driving gear are rotatable relative to said input shaft.

14. A manual transmission comprising:

an input shaft;

an output shaft;

first and second intermediate shafts parallel to said input shaft; and a reverse gearing comprising:
  a low-speed driving gear disposed on said input shaft;
  a low-speed driven gear disposed on said first intermediate shaft for meshing with said low-speed driving gear;
  a reverse-only driving gear disposed on said first intermediate shaft;
  a synchronizer for reverse gear stage disposed on said first intermediate shaft or reverse-only driving gear for effecting a lock between said low-speed driven gear and said reverse-only driving gear during said reverse gear stage so that power is transferred from the input shaft to the output shaft, the locking of said low-speed driven gear and said reverse-only driving gear being the only lock required to effect the reverse gear stage; and
  an intermediate-speed driven gear disposed on said second intermediate shaft for meshing with the reverse-only driving gear.

15. The transmission according to claim 14, wherein said low-speed driving gear is a first-speed driving gear that is fixed to said input shaft, and said intermediate-speed driven gear is a third-speed driven gear.

16. The transmission according to claim 14, wherein said low-speed driving gear is a first-speed driving gear that is fixed to said input shaft, and including a second-speed driving gear fixed to said input shaft.

17. The transmission according to claim 16, including a third-speed driving gear, a fourth-speed driving gear, a fifth-speed driving gear and a sixth-speed driving gear, said fifth-speed driving gear and said sixth-speed driving gear being fixed to said input shaft, said third-speed driving gear and said fourth-speed driving gear being rotatable relative to said input shaft.

18. A manual transmission comprising:

an input shaft of a single structure;

first and second intermediate shafts disposed in parallel with said input shaft; and a reverse-gear stage;

said reverse-gear stage including:
  a low-speed driving gear fixed on said input shaft;
  a low-speed driven gear rotatably disposed on said first intermediate shaft for meshing with said low-speed driving gear;
  a reverse-only driving gear rotatably disposed on said first intermediate shaft;
  a synchronizer for reverse-gear stage disposed on said first intermediate shaft or reverse-only driving gear for causing said low-speed driven gear and said reverse-only driving gear to engage and disengage;
  an intermediate-speed driven gear disposed on said second intermediate shaft for meshing with the reverse-only driving gear;
  a driving gear meshing with said intermediate-speed driven gear and rotatably disposed on said input shaft; and
  wherein said low-speed driven gear includes a low-speed synchronizer for establishing a driving engagement and disengagement of a low-speed stage with said first intermediate shaft.

19. The transmission according to claim 18, wherein an intermediate-speed synchronizer, a low-speed synchronizer and a high-speed synchronizer are disposed on said input shaft, said first intermediate shaft and said second intermediate shaft, respectively, in dispersed fashion.

20. The transmission according to claim 18, wherein said low-speed driven gear of said reverse-gear stage includes:
  a gear body for meshing with said low-speed driving gear of said reverse-gear stage; and
  a first gear piece capable of engaging with said synchronizer for reverse-gear stage;
  another gear train for constructing intermediate speed or high speed being situated between said gear body and said first gear piece in the axial direction thereof, said another gear train not being used for establishing said reverse-gear stage.

* * * * *